US Patent Office
3,154,375
Patented Oct. 27, 1964

3,154,375
POTASSIUM PLUTONIUM SULFATE SEPARATION PROCESS
Michael Cefola, Yonkers, N.Y., assignor to the United States of America as represented by the United States Atomic Energy Commission
No Drawing. Filed July 2, 1947, Ser. No. 758,713
6 Claims. (Cl. 23—14.5)

This invention relates to an improvement in the potassium plutonium sulfate process for separating plutonium from contaminating elements.

Reference herein to any of the elements is to be understood as denoting the element generically whether in its free state or in the form of a compound unless otherwise indicated by the context.

Plutonium is normally produced by the reaction of uranium with neutrons. A neutron is captured by a $U^{238}$ atom, thus forming $U^{239}$, which decays with a half-life of 23 minutes to $Np^{239}$, which in turn decays with a half-life of 2.3 days to $Pu^{239}$. Neutrons also react with $U^{235}$ to produce nuclear fission and two fragments called fission fragments which undergo beta disintegration into chains of two groups, a light group of elements with atomic numbers from about 35–45 and a heavy group with atomic numbers from about 51–60. These elements either alone or combined as compounds are known as fission products. It will be readily apparent that plutonium as produced by bombardment of uranium is always associated with uranium, neptunium and radioactive fission products.

One of the methods of separating plutonium from the elements with which it is contaminated in a neutron irradiated uranium mass, is the precipitation process employing potassium plutonium sulfate. This process is based upon the fact that the compound formed by the reaction between quadrivalent plutonium ions and potassium ions and sulfate ions in an aqueous solution, is relatively insoluble in aqueous solution. Certain contaminants of plutonium in neutron irradiated uranium notably uranium when in the hexavalent state, neptunium, yttrium and other members of the yttrium sub-group of rare earths (as defined in the book, "A System of Qualitative Analysis for the Rare Elements," by Noyes and Bray. The Macmillan Company, 1943, page 213, and consisting of yttrium and the elements between gadolinium and lutetium, inclusive) are soluble in an aqueous solution containing potassium and sulfate ions. The process of separating plutonium from these aforementioned contaminants comprises forming an aqueous solution containing quadrivalent plutonium and these contaminants in an ionic state, the solution having a pH of less than 7.1 and contacting said ions contained in said solution with ions of potassium and sulfate whereby a precipitate of potassium plutonium sulfate is formed and isolating said precipitate. This process is quite effective and may be used where plutonium is present in any concentrations from tracer concentration to and including concentrations at which plutonium may be precipitated directly. Where the plutonium is present in such a small concentration that it may not be precipitated independently from the solution a career precipitate of potassium lanthanum sulfate or potassium thorium sulfate may be precipitated in the solution and as these precipitates are isomorphic with the potassium plutonium sulfate they will carry the plutonium salt from solution. The aforementioned separation process, however, has one disadvantage in that when potassium plutonium sulfate is precipitated from an aqueous solution by this method, it is necessary that the solution be nearly saturated with potassium sulfate in order to secure effective precipitation. Plutonium as produced by neutron irradiation of a uranium mass is usually in the proportion of about 250 g. of plutonium per metric ton of irradiated uranium metal. The mixture of plutonium and uranium as it comes from the pile is usually dissolved in a nitric acid solution to furnish a 20% uranyl nitrate hexahydrate. Where this solution must be saturated with potassium sulfate in order to carry out this separation process, it requires about three tons of potassium sulfate for each ton of dissolved uranium in order to effect a quantitative precipitation. The disadvantage is quite readily apparent.

It is an object of this invention to provide an improvement in the potassium plutonium sulfate separation process whereby potassium plutonium sulfate may be efficiently precipitated from a solution containing less than 10% by weight of potassium sulfate.

Other objects of this invention will be apparent from the following discussion.

I have discovered that potassium plutonium sulfate may be precipitated from a solution, which is a mixture of water and a water-soluble monohydric alcohol, said solution containing dissolved potassium sulfate in a concentration far less than that required to saturate said solution. This process for separating plutonium differs from the methods previously used in that the potassium plutonium sulfate is precipitated from a mixture of water and an alcohol rather than from an aqueous solution. The advantages of this improvement are that the potassium plutonium sulfate is more insoluble in this solution than in an aqueous solution and a great deal less potassium sulfate is needed to quantitatively precipitate the potassium plutonium sulfate in this solution. Good results may be obtained using the process of this invention where the amount of potassium sulfate in solution is only 15% of that which would be required to saturate the solution.

By the process of this invention the aqueous solution from which the potassium plutonium sulfate is to be precipitated has mixed with it a monohydroxy alcohol containing not more than three carbon atoms and miscible with water in all proportions. This classification includes methyl, ethyl, isopropyl, and allyl. The alcohols may be either saturated or unsaturated. The concentration of alcohol in the solution is not critical since these alcohols are miscible in all proportions with water. It has been found desirable, however, to use not more than 50% by weight of alcohol to the solution and good results have been obtained where as little as 10% by weight of alcohol has been used. Twenty percent by weight of alcohol is the quantity normally used to make the solution. The potassium sulfate concentration in solution may be reduced so that the solution contains approximately 3 to 7% by weight of potassium sulfate. This contrasts with the 20% by weight of potassium sulfate which was required to saturate the solution with potassium sulfate in the older method. The former practice was to digest the solution containing the potassium sulfate and dissolved plutonium and contaminants for a short time at a temperature of about 95° C. to effect complete precipitation of the potassium plutonium sulfate. Because of the lower boiling temperature of the mixture of alcohol and water, it may be necessary to change this procedure somewhat so that the digestion temperature is kept below the boiling temperature of the alcohol-water mixture used. This temperature will, of course, depend upon the alcohol used and the concentration, and may readily be determined from the standard tables or by observation.

The process of this invention may be successfully used to separate plutonium from uranium, neptunium, yttrium or other members of the yttrium sub-group of rare earths. Concentration of the plutonium in the solution is not critical and this improvement may be used where plutonium is precipitated directly from solution or where it is precipitated with a carrier of potassium thorium sulfate or potassium lanthanum sulfate.

Where this improvement is used in the potassium plutonium sulfate process the general steps of the process may follow the conventional steps and no other adjustments in the process except those mentioned above need be made. Thus, the solution containing the plutonium may be formed in the usual manner, i.e., by dissolving the irradiated uranium mass in nitric acid to form a solution of uranyl nitrate hexahydrate. The reducing agents usually used to maintain the plutonium in an oxidation state less than +5 may be used. The order of dissolving potassium and sulfate soluble compounds may follow the conventional methods and the method of separating the potassium plutonium sulfate or the carrier precipitate containing plutonium may also be conventional. The order of introducing the alcohol into the solution is not critical but it is usually introduced following formation of the uranyl nitrate hexahydrate solution and before the introduction of the soluble potassium and sulfate salts. The solution should be maintained in a neutral or acid state, since there would be a possibility of hydroxides precipitating in a basic solution.

Now that this invention has been described, its use may be illustrated by the following examples. These examples show the improved results obtained with the potassium plutonium sulfate method of separating plutonium from uranium and fission products when the process of this invention is incorporated in that separation method.

*Example I*

One-tenth ml. of 10% potassium sulfate solution was added to 0.05 ml. of $Pu^{+4}$ sulfate solution containing 1.8 mg. of plutonium in dilute sulfuric acid. Two and eight-tenths mg. of yttrium sulfate and 0.02 ml. of methyl alcohol were then added to the solution. The solution was heated for 10 minutes at 85° C. The precipitate thus formed was separated from solution by filtering and the precipitate analyzed by the counter technique. This analysis showed the precipitate contained 95% of the plutonium and less than 1% of the yttrium.

*Example II*

One ml. of 40% uranyl nitrate hexahydrate solution containing a quantity of plutonium sufficient to give 2450 alpha counts per minute was added to a small quantity of 6 N $H_2SO_4$ and this solution was evaporated to $SO_3$ fumes in a platinum dish. The remaining residue was then dissolved in water to form 2.2 ml. of solution. To this was added 0.3 ml. of lanthanum nitrate containing 3 mg. of $La^{+3}$, 100 mg. of solid potassium sulfate and 0.5 ml. of ethyl alcohol. This solution was heated on a water bath for 10 minutes at 75° C. An additional 0.5 ml. of ethyl alcohol was then added to the solution. The precipitate which formed on standing was analyzed by counter analysis and was found to contain a quantity of plutonium sufficient to give 1930 counts per minute. In this example after addition of all reagents the solution contained an approximate percentage by weight of potassium sulfate of 3% and an approximate percentage by weight of ethyl alcohol of 20%. A similar experiment was carried out with all reagents the same except no ethyl alcohol was introduced into the solution and the approximate percentage by weight of potassium sulfate added to the solution was 20%. In the example using the ethyl alcohol 79% of the plutonium was found in the final precipitate while in the example where ethyl alcohol was not used 66% of the plutonium was found in the precipitate. The amount of potassium sulfate used in the example wherein ethyl alcohol was used was approximately 3%; while in the example where ethyl alcohol was not used the approximate percentage by weight of potassium sulfate was 20%.

The process of this invention is not limited to the examples given above wherein the process employed is used to separate plutonium from uranium, but it also may be employed to separate plutonium from neptunium, or yttrium or members of the yttrium sub-group of rare earths. It may also be employed in a process for the production of potassium plutonium sulfate.

Numerous other modifications are also possible. Changes therefore may be made without departing from the spirit and scope of the invention as described in the appended claims in which it is the intention to claim all novelties and invention as broadly as possible in view of the prior art.

What is claimed is:

1. In a process for separating plutonium (IV) values from solutions having a pH value below 7.1 by precipitation with ions of potassium and sulfate ions, the improvement which comprises reacting said values with said ions in an aqueous medium containing from 10 to 50% by weight of a lower alkyl alcohol containing up to three carbon atoms, said alcohol being miscible in all proportions with water; and separating the precipitate formed from the solution.

2. The process of claim 1 in which the alcohol is methyl alcohol.

3. The process of claim 1 in which the alcohol is ethyl alcohol.

4. The process of claim 1 in which the alcohol is isopropyl alcohol.

5. The process of claim 1 wherein the amount of alcohol is 20% by weight.

6. The process of claim 1 wherein the solution is at elevated temperature slightly below the boiling point of the alcohol.

References Cited in the file of this patent

UNITED STATES PATENTS

| | | |
|---|---|---|
| 2,121,020 | Christmann | June 21, 1938 |
| 2,418,372 | Smith | Apr. 1, 1947 |
| 2,857,241 | Angerman | Oct. 21, 1958 |

FOREIGN PATENTS

| | | |
|---|---|---|
| 491,640 | Great Britain | Sept. 6, 1938 |

OTHER REFERENCES

Mellor: "Comprehensive Treatise on Inorganic and Theoretical Chemistry," vol. 7, pages 243, 246 (1927); vol. 12, page 103, 1932.

Anderson: Paper No. 6.14, pages 796–800 both in "The Transuranium Elements," by Seaborg et al., 1st Edition (1949), McGraw-Hill Book Co., Inc., N.Y.C.

Anderson: Paper No. 6.2, pages 724–728.

Seaborg et al.: The Transuranium Elements, Part I, pages 724–728 (1949).